May 12, 1953 R. N. KIRCHER ET AL 2,638,526
ELECTRICALLY HEATED BASE FOR COOKING
Filed Oct. 13, 1950 2 Sheets-Sheet 1

INVENTORS
RALPH N. KIRCHER
BY WILLIAM G. LAABS
John W. Michael
ATTORNEY

May 12, 1953  R. N. KIRCHER ET AL  2,638,526
ELECTRICALLY HEATED BASE FOR COOKING
Filed Oct. 13, 1950  2 Sheets-Sheet 2
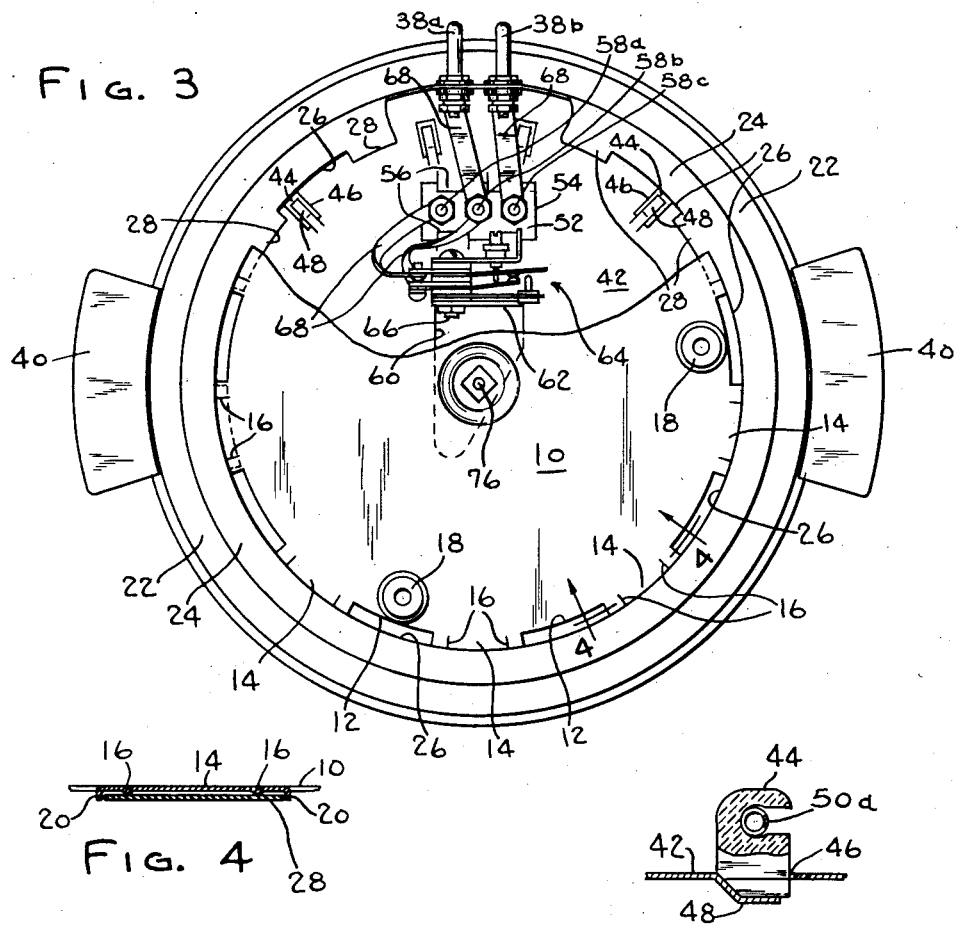
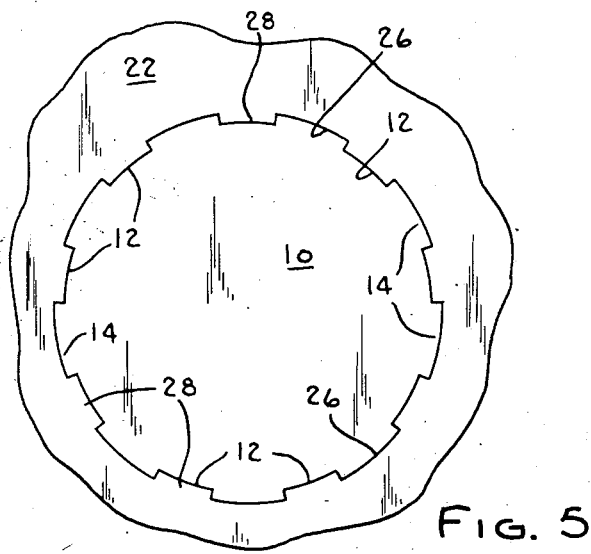
INVENTORS
RALPH N. KIRCHER
BY WILLIAM G. LAABS
John W. Michael
ATTORNEY Patented May 12, 1953

2,638,526

UNITED STATES PATENT OFFICE 2,638,526

ELECTRICALLY HEATED BASE FOR COOKING

Ralph N. Kircher and William G. Laabs, West Bend, Wis., assignors to West Bend Aluminum Co., West Bend, Wis., a corporation of Wisconsin Application October 13, 1950, Serial No. 189,938

6 Claims. (Cl. 219—19)

This invention relates to improvements in electrically heated bases for cooking utensils, and particularly for such bases adapted to be used for small portable ovens or the like.

Portable ovens have been designed for use on the open tops of gas or electric stoves. In some quarters stoves are not available and it is desirable to have an electrically heated base for such ovens or other cooking utensils. Such bases to be practical must be capable of being positioned directly on a table or counter top or the like and used without damaging such tops by heat.

One of the objects of this invention, therefore, is to provide such an electrically heated base which in operation will not transmit and radiate downwardly enough heat to damage table tops.

Another object of this invention is to provide an electrically heated base which is thermostatically controlled by the temperature within the oven or other cooking utensil heated thereby without interfering with the removal of the oven top or interchange of cooking utensils.

A still further object of this invention is to provide an electrically heated base of the kind herein described which is comparatively inexpensive to produce and assemble.

In the attainment of these objects certain features are important. The heating element is mounted below a work-receiving top and above the peripheral margin of a reflector. The reflector is made of aluminum because such metal does not lose its reflecting qualities with prolonged use. The central portion of the reflector is convex upwardly to direct the rays of heat toward the perimeter of the top. The reflector and top are carried on a body spaced substantially from the bottom thereof. The sides of the body immediately below the reflector are slotted to provide upper ventilators. The bottom, which acts as a protector reflector, is also provided with ventilating openings. Thus most of the heat generated by the heating element is radiated or transmitted to the top. Any heat radiating downwardly from the reflector will be reflected upwardly by the bottom and not transmitted therethrough to the table top. The air between the bottom and the reflector which becomes heated will rise and escape through the upper ventilators and be replaced by cool air entering upwardly through the ventilating openings in the bottom. Of course the bottom will become heated somewhat above ambient temperature but it is provided with feet of heat-resistant material and spaced a reasonable distance from the table top or other surface on which the base is positioned. Thus there is no direct contact and the amount of heat radiated downwardly from the bottom is not sufficient to do any damage to such top or surface.

Control of the unit is obtained by using two sections of heating elements connected in parallel with a thermostatic switch to disconnect one of the sections. The thermostatic switch is preferably positioned between the reflector and the bottom and adjacent an opening in the central portion of the reflector. Thusly positioned the thermostatic switch will be operated to open the circuit to one of the heating element sections when the air between the reflector and the bottom reaches a predetermined degree. This will cut substantially in half the amount of heat being generated so that losses will be in excess of input and temperatures will drop. However, if there is a sudden drop in temperature due to the condensation of steam passing down through the opening in the reflector, such condensation will be directly applied to the thermostat and cause it to rapidly close the switch again increasing the heat input.

The novel features which are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 3 is a bottom plan view of such base;

Fig. 4 is an enlarged fragmentary sectional view taken on line 4—4 of Fig. 3;

Fig. 5 is a fragmentary schematic view showing the shape of the bottom as blanked or cut from the body in the manufacture of such base;

Fig. 6 is an enlarged fragmentary sectional view taken on line 6—6 of Fig. 2;

Fig. 7 is an enlarged fragmentary sectional view taken on line 7—7 of Fig. 2.

Figure 1:
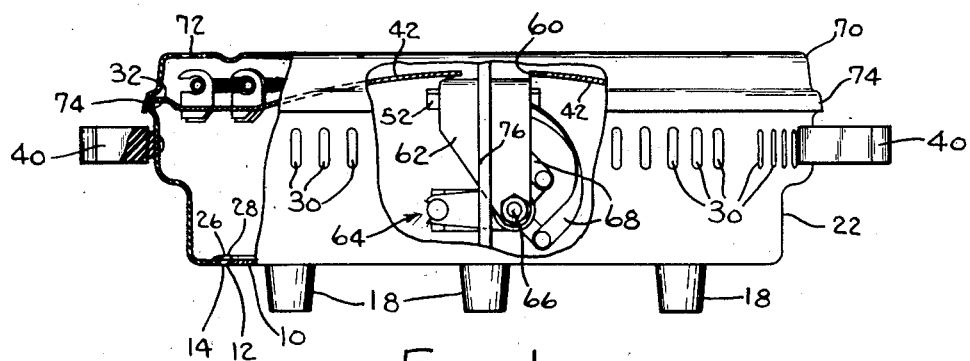
Fig. 1 is a view in side elevation of an electrically heated base embodying the present invention with parts broken away and shown in section for the sake of clarity in illustration.

As is seen from the drawings, the essential elements of the electrically heated base comprise a bottom 10, a body 22 supported on the bottom, a reflector 42 mounted on the top of the body and spaced from the bottom, heating elements 50 above and carried by such reflector, a thermostatic switch 64 for controlling the heating elements between such reflector and bottom, and a top 70 which comprises the bottom of the oven on which the over top (not shown) is seated or on which other cooking utensils are placed. These elements are held together by a single bolt 76 which extends from the top 70 to the bottom 10.

The bottom 10 is cut or blanked from the same sheet of material as the body 22 in accordance with the layout shown in Fig. 5. As a result the perimeter of the bottom 10 has a plurality of notches 12 spaced by intervening projections 14 and the inner edge of the body 22 has complementary projections 28 and intervening notches 26. In this exemplification the projections 14 are angularly longer than the notches 12 to provide turned-up locating lugs 20 (see Fig. 4) which engage the projections 28 when the body is assembled on the bottom to prevent relative rotation therebetween. It is also desirable to have radially extending upwardly projecting ribs 16 formed on the projections 14 to space such projections from the projections 28 and thereby lessen the amount of heat that will be conducted from the body 22 to the bottom 10. The locating lugs and spacing ribs may be formed on the projections 28 instead of the projections 14 and accomplish the same function. Mechanically it is a little simpler to form such elements on the projections 14 because the dies and shaping steps for the bottom 10 are much more simple than in the case of the body. The bottom 10 is supported above the surface of the table or counter on which it rests by three substantially equally angularly spaced legs 18 made of heat-insulating material and fastened to the bottom in the usual manner. However, it is desirable to locate the feet 18 so that each one is in alinement with a notch 12 and are thus directly in the path of air moving up through the ventilating openings formed by the cooperation of notches 12 and 26.

The body 22 has a lower inturned flange 24 on the inner edge of which are the notches 26 and projections 28 heretofore described in connection with the bottom 10. The side of the body 22, adjacent the upper end, has a plurality of radially spaced ventilating slots 30 to let heated air flow from between the bottom 10 and reflector 42. The top edge of the body 22 has an annular shoulder terminating in an upper vertical flange 32. This flange, as is shown in Fig. 7, may be notched at spaced portions to provide inwardly bent tabs 34 on which the reflector 42 can be supported. However, the reflector 42 can rest directly on the top of flange 32. There can be a notch 36 in such flange which will receive a tongue 37 on the reflector 42 to angularly relatively locate such members. Such location may be accomplished however by an assembly jig and the parts thereafter held against rotation by frictional fit. Electrical plug type terminals 38a and 38b of standard construction are insulatingly secured in the customary manner in openings in the side of the body 22 with their exterior portions adapted for fitting into an electrical socket and their interior portion connected to the heating elements. To facilitate the handling of the electrical base the body 22 has secured at opposite sides thereof handles 40 made of heat-insulating material.

The body 22 is assembled on the bottom 10 by relatively angularly locating the projections 28 so that they seat upon the projections 14. This brings the notches 12 opposite the notches 26 to form ventilating openings in the bottom of the base through which air may ascend as heated air within the body 22 escapes out through the slots 30. The importance of this arrangement is that it not only provides for cooling by means of convection of air but also breaks up the sectional continuity of the metal between body and bottom greatly lessening the transfer of heat by conduction to the bottom.

The reflector 42 is formed from sheet aluminum because it retains its reflecting quality with continued use, and the central portion thereof is arched upwardly in semi-dome fashion, as is shown in Fig. 1, to radiate heat toward the perimeter thereof. A plurality of slots 46 are cut in the peripheral margin of the reflector 42 and spaced in two circularly extending rows. The material cut from these slots is bent downwardly to form holding lugs 48. Ceramic insulators 44 are inserted upwardly through the slots 46 and the lugs 48 are bent up against the wider base of the insulators to lock such insulators in place within the slots substantially in the manner shown in Fig. 6. The heating element consists of an outer section 50a and an inner section 50b held by the inherent spring action thereof in the insulators 44. This construction locates the heating element closely adjacent the perimeter of the reflector which is desirable in the case of portable ovens as will be more fully pointed out. Inwardly of the heating elements the reflector 42 is provided with a rectangularly shaped opening 54 having inward projections 56. An insulating terminal block 52 is inserted in this opening from the bottom of the reflector with an enlarged base resting against the lower surface of the reflector. The projections 56 are bent against such base to hold the block in place. Three threaded terminals 58a, 58b, and 58c are mounted in the terminal block 52 and provide the means of electrically connecting the heating element sections to the plugs 38a and 38b and the thermostatically operated switch 64 in the manner hereinafter described. In using the electrically heated base for heating a portable oven, steam is often generated within the oven and to provide for its escape the reflector 42 has a centrally located opening 60. To simplify manufacturing processes, the material cut from the reflector 42 to form such opening is bent downwardly to provide a mounting 62 which supports the thermostatic switch indicated generally at 64.

Figure 8:
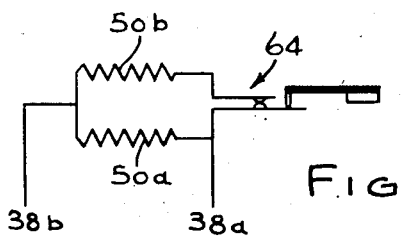
Fig. 8 is a schematic wiring diagram illustrating the electrical connections of the heating elements and thermostatically controlled switch.

The thermostatically controlled switch 64, which is secured to the mounting 62 by a bolt and nut 66, is of standard design and does not form a part of this invention and is not described in detail. It is essential that the switch be normally biased to closed position and that its contacts open when its bimetallic power element is subjected to a predetermined degree of temperature above ambient temperature. Like standard switches of this type the unit has a factory adjustment to regulate it to operate at the desired temperature. Ribbon-like conductors 68 electrically connect one of the contacts of the switch 64 to the terminal 58a, the other of the switch contacts to the terminal 58b, the terminal 58b to the plug 38a, and the terminal 58c to the plug 38b. One end of each of heating element sections 50a and 50b is electrically connected to the terminal 58c. The other end of section 50a is connected to terminal 58b and the other end of heating section 50b is connected to terminal 58a. As is shown in the schematic diagram of Fig. 8, the switch 64 is normally closed to connect the sections 50a and 50b in parallel across the source of electrical power. When the heat rises in the body 22 to the predetermined degree, the thermostatic switch 64 will open and the section 50b will be disconnected. Thereafter heat will be generated only by the section 50a.

The top 70, which also constitutes the bottom of the portable oven, is made of stainless steel because its surface darkens with use and this makes the top more heat-absorbing. The top 70 has a depending flange 74 which snugly fits around the vertical flange 32 and supports the top centrally on the body 22. A bolt 76 extends downwardly through a central opening in the top 70 outwardly through an opening in the bottom 10. A nut threaded on such bolt compresses the top 70 against the bottom 10 clamping the body 22 and reflector 42 in place therebetween. As is the standard practice in the case of stove top ovens there is a plurality of openings extending circumferentially around and adjacent the perimeter of the top 70 to permit the free passage of air, gases and steam therethrough.

Figure 2:
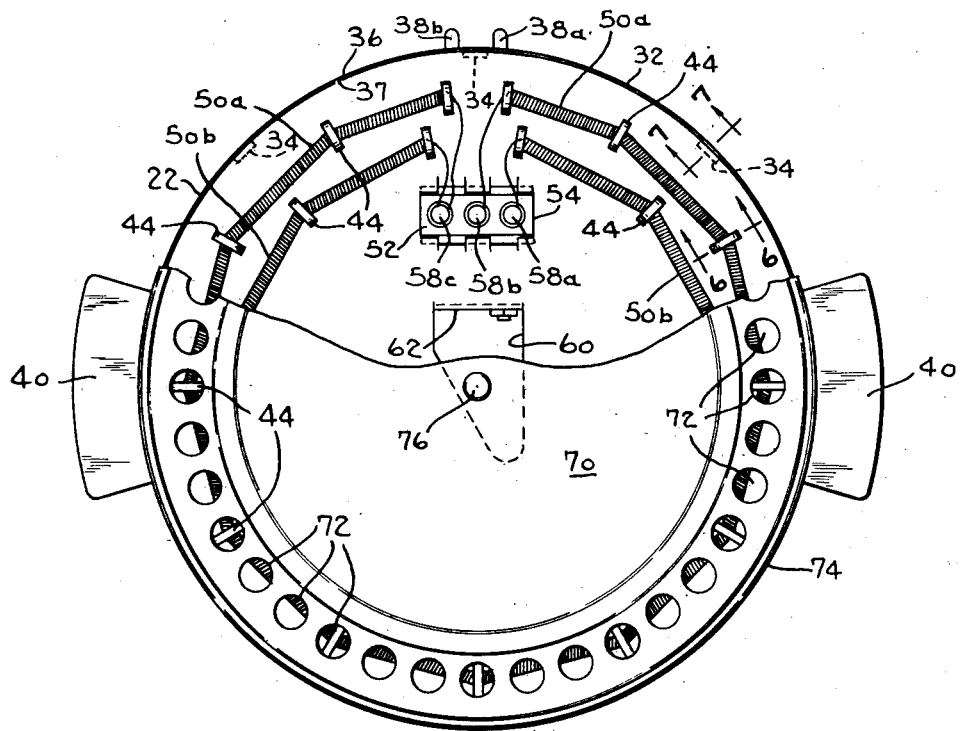
Fig. 2 is a top plan view of such base.

One of the features of this invention resides in the relative positioning of these openings with respect to the heating element. As is shown in Fig. 2 the section 50a is in substantially vertical alinement with the openings 72. This permits direct radiation of heat from the heating element through the openings 72 to the oven cover (not shown).

Another feature of this invention is the positioning of the thermostatic switch 64 between the reflector 42 and the bottom 10, closer to the bottom than to the reflector. Thus positioned the thermostat will be operated to cut down the heat supply before enough heat can be absorbed by the bottom 10 to cause it to radiate a dangerous amount downwardly toward the table top or other supporting surface. In addition to this the thermostat is located in substantial alinement with the opening 60. Thus as steam is generated in the oven and is forced downwardly through the openings 72 and opening 60, such steam will directly strike against the thermostat switch 64. The cooling effect of the steam as it condenses will cause the thermostat switch, if the switch is then open, to rapidly close and thus supply additional heat in anticipation of the cooling action taking place within the oven by condensation of such steam therein.

Although only one embodiment of the invention is shown and described herein, it will be understood that this application is intended to cover such changes or modifications as come within the spirit of the invention or scope of the following claims:

We claim:

1. In an electrically heated base for small portable ovens or the like, a bottom provided with means for supporting said bottom spaced from a table top or the like, a body having upper and lower ends mounted on said bottom with said lower end in engagement with said bottom, said bottom being formed from the same piece of material as said body and having an outer periphery with notches and projections, said lower end of said body having an opening with notches and projections adapted to interfit with notches and projections on said bottom, said body and bottom being positioned with the projections on said body resting on the projections on said bottom to support said body, said notches on each being in alinement to provide ventilating openings, a reflector mounted on said upper end, a heating element supported by and above said reflector, and a top carried by said body and extending over said reflector and said heating element to provide a bottom for a portable oven or the like.

2. In an electrically heated base for small portable ovens or the like, a bottom provided with means for supporting said bottom spaced from a table top or the like, a body having upper and lower ends mounted on said bottom with said lower end in engagement with said bottom, said bottom being formed from the same piece of material as said body and having an outer periphery with notches and projections, said lower end of said body having an opening with notches and projections adapted to interfit with notches and projections on said bottom, said body and bottom being positioned with the projections on said body resting on the projections on said bottom to support said body, said notches on each being in alinement to provide ventilating openings, a reflector mounted on said upper end, said body having vents near said upper end below said reflector to permit fluids to move by convection upwardly through said body from said ventilating openings, a heating element supported by and above said reflector, and a top carried by said body and extending over said reflector and said heating element to provide a bottom for a portable oven or the like.

3. In an electrically heated base for small portable ovens or the like, a bottom having on its perimeter radial projections spaced by notches, a body having a lower inturned flange terminating in an inner edge, said edge having radial projections spaced by notches, said body being positioned on said bottom with the projections of said body resting on the projections of said bottom and with the notches of said body opposite the notches of said bottom to form ventilating openings, the edges of one of the projections of one said bottom or body being bent to form lugs engaging the projections on the other of said bottom or body to prevent rotational displacement therebetween, an electric heating element carried by said body, and means for holding said bottom and body assembled.

4. In an electrically heated base for small portable ovens or the like, a bottom provided with means for supporting said bottom spaced from a table top or the like, a body mounted on said bottom and having upper and lower ends with said lower end in engagement with said bottom, said upper end terminating in a vertical peripheral flange, a relatively thin aluminum reflector having an outer edge extending to and supported by said vertical peripheral flange, said reflector having a peripheral margin therearound adjacent to said outer edge, a heating element carried by insulators on said reflector and positioned above and in substantial vertical alinement with said peripheral margin and closely adjacent said outer edge, said reflector being arched upwardly in semi-dome fashion from the inner edge of said peripheral margin to the center of said reflector to provide a curved surface for radiating heat from said heating element toward the outer edge of said reflector, and a top carried by said body and extending over said reflector and said heating element to provide a bottom for a portable oven or the like.

5. A base as claimed in claim 4 in which said vertical flange has inturned tabs and said outer edge is seated within said flange and rests on said tabs.

6. A base as claimed in claim 4 in which said reflector has an opening in the central portion thereof with a mounting adjacent said opening, and in which a thermostatic switch for controlling said heating element is mounted between said bottom and said reflector on said mounting and is immediately adjacent said opening, whereby vapors traveling down through said opening pass directly to said thermostatic switch.

RALPH N. KIRCHER.
WILLIAM G. LAABS.

References Cited in the file of this patent

UNITED STATES PATENTS

| Number | Name | Date |
|---|---|---|
| 1,044,269 | Shaler | Nov. 12, 1912 |
| 1,705,727 | Forshee | Mar. 19, 1929 |
| 1,758,658 | Fisher | May 13, 1930 |
| 1,835,602 | Kercher et al. | Dec. 8, 1931 |
| 2,028,033 | Wolcott | Jan. 14, 1936 |
| 2,097,825 | Wolcott | Nov. 2, 1937 |
| 2,117,578 | Smith | May 17, 1938 |
| 2,230,488 | Gough | Feb. 4, 1941 |
| 2,269,111 | Jepson et al. | Jan. 6, 1942 |
| 2,339,183 | Myers | Jan. 11, 1944 |
| 2,459,169 | Koci | Jan. 18, 1949 |